United States Patent [19]
Arpalahti et al.

[11] Patent Number: 5,095,825
[45] Date of Patent: Mar. 17, 1992

[54] METHOD AND APPARATUS FOR FEEDING FUEL INTO A PRESSURIZED SPACE

[75] Inventors: Olli Arpalahti; Eero Berg; Jorma Nieminen, all of Varkaus, Finland

[73] Assignee: A. Ahlstrom Corporation, Karhula, Finland

[21] Appl. No.: 620,548

[22] Filed: Dec. 4, 1990

[30] Foreign Application Priority Data

Dec. 7, 1989 [FI] Finland .................. 895835

[51] Int. Cl.$^5$ ............................. F23K 3/00
[52] U.S. Cl. ..................... 110/101 C; 110/104 R; 110/109; 110/114; 110/267; 414/187
[58] Field of Search ........... 110/104 R, 101 R, 101 C, 110/109, 101 CF, 267, 293, 114; 414/187, 189, 217; 222/217

[56] References Cited

U.S. PATENT DOCUMENTS

| | | | |
|---|---|---|---|
| 4,033,467 | 7/1977 | Bewley et al. | 414/187 |
| 4,037,736 | 7/1977 | Pownall et al. | 214/23 |
| 4,150,759 | 4/1979 | Bell, Jr. | 414/187 |
| 4,250,817 | 2/1981 | Michel | 110/104 R |
| 4,400,125 | 8/1983 | Jensen | 414/187 |
| 4,787,535 | 11/1988 | Angly | 222/148 |
| 4,790,692 | 12/1988 | Bunyoz et al. | 110/104 R X |

FOREIGN PATENT DOCUMENTS 0203335 12/1986 European Pat. Off. .
1024881 2/1958 Fed. Rep. of Germany .

*Primary Examiner*—Edward G. Favors
*Attorney, Agent, or Firm*—Nixon & Vanderhye

[57] ABSTRACT

A method and apparatus for feeding solid material into a pressurized combustion or gasification plant in stages. The feed apparatus (10) is provided with an inlet (18), sluice chamber (30), and outlet (20). In a loading stage, solid material is conveyed through the inlet into the sluice chamber. The loaded sluice chamber is transferred to an unloading stage. During the transfer stage, the inlet (18) is closed. During the unloading stage, solid material is conveyed through the outlet (20) into a pressurized space (26). The volume of the sluice chamber (30) is adjustable so that the volume is enlarged during the loading stage and reduced during the unloading stage. The volume is adjusted e.g. by a piston (38).

19 Claims, 2 Drawing Sheets

METHOD AND APPARATUS FOR FEEDING FUEL INTO A PRESSURIZED SPACE

BACKGROUND AND SUMMARY OF THE INVENTION

The present invention relates to a method of feeding solid material into a pressurized space in a pressurized combustion or gasification plant.

In pressurized combustion or gasification plants, fuel and other material to be introduced into the combustion chamber have to be fed from the atmospheric pressure of a storage container to a state of high pressure within the combustion chamber. The pressure of the combustion chamber varies from 5 to 100 bar. Conventional feeding means oftentimes fail in such high pressure feeding.

Fuel may be introduced into a pressurized space by means of a briquette press. However, the briquettes have to be crushed, for example, with a grinder before they reach the combustion or gasification stage. The briquettes easily become too hard, which impedes the grinding. Furthermore, electric power consumption of the briquette press is high.

The best-known and most common way of feeding fuel into a pressurized space is feeding with a pressurized rotary feeder. The rotary feeders, however, involve certain problems such as poor tightness, risk of arching, and restrictions on the pressure which can be achieved with such feeders. In rotary feeders, the sluice chamber is alternately connected to a fuel storage container and a pressurized fuel chamber. The pressurized space is supplied with fuel and the fuel amount dosed in accordance with the volume of the sluice chamber. To obtain the desired fuel feed, the sluice chamber has to be relatively large, which raises the cost of the equipment.

In rotary feeders, e.g. pocket feeders, the infeed material easily arches. In such cases, poor emptying of the pocket constitutes a problem when the feeder moves to a discharge position. Similar problems with arching and uneven emptying have been experienced with storage silos. In addition, empty pockets of rotary feeders always convey some pressurized gas out of the system, and handling of such escaped gas is difficult. Furthermore, as the loss of pressurized gas increases, the cost of pressurization increases.

It is important that the feeders be gas-tight. Feeding of fuel into a pressurized space has to be facilitated without any pressure being released or harmful gases being leaked out through the feeder. Light or loose fuel, e.g. in screw feeders, is not capable of forming a tight barrier against hot gases escaping from a pressurized space. Thus, such gases possibly flowing back may ignite the fuel already in the fuel silo.

By means of plug screw feeders, fuel may be compressed to some extent so as to facilitate feeding of fuel to a pressure of about 4 bar. In plug screw feeders, the fuel may, however, form a plug which partly or completely clogs the feeding means. If the material to be fed is e.g. peat, the moisture content of which is higher than 65%, no plug is formed, but the material is decomposed and the feeding fails. Feeding to a pressure in excess of 10 bar by means of a plug screw is unsuccessful even though the fuel is dryer. If the moisture of, for example, milled peat is about 50 to 75%, feeding thereof to a pressurized combustion or gasification chamber by earlier known means is generally unsuccessful, and the electric power consumption of the plug screw is also high.

Finnish patent application 864545 teaches a pneumatic transport system for feeding fuel into a pressurized space. The feeding means comprises an enclosed vessel with a rotor and at least one funnel-shaped material chamber disposed in said vessel. The rotor is movable with a drive means. The upper section of the vessel and rotor is provided with a fuel inlet and the lower section with a fuel outlet. Fuel is discharged from the material chamber by means of pressurized gas. For that purpose, pressurized gas is supplied to the outlet duct of the material chamber. Fuel easily arches in funnel-shaped material chambers. Arching prevents complete emptying of the material chamber, thereby causing uneven fuel feed. Some pressurized gas remains in the material chamber after the fuel has been discharged therefrom. Even though the pressurized gas is discharged, some of this gas remains in the material chamber and, in refilling, such gas is harmful as it may prevent even distribution of the fuel in the material chamber.

An object of the present invention is to provide an improved method and apparatus for feeding solid material into a pressurized space, even when the pressure difference is substantial.

Another object of the invention is to provide a method of feeding moist solids.

A further object of the invention is to provide a method and apparatus for introducing loose fuel, such as peat or other bio-fuel, into a pressurized space.

A still further object of the invention is to provide an improved feed apparatus where the feed-disturbing arching phenomenon has been eliminated or minimized.

To meet the objects mentioned hereinabove, the method according to the present invention is characterized in that the chamber volume of a sluice chamber is enlarged in the loading stage and reduced in the unloading stage.

The feed apparatus according to the invention is further characterized in that the sluice chamber is cylindrical and that it is provided with a piston having substantially the same diameter as the cylinder and being capable of adjusting the chamber volume of the sluice chamber.

In accordance with a preferred embodiment of the invention, the feed apparatus comprises two cylindrical sluice chambers disposed in a cylindrical vessel. Both cylindrical sluice chambers are disposed at equal distances from the center of the vessel encasing the sluice chamber. As the vessel rotates around its center, both sluice chambers thus move at equal distances from the center of the vessel.

The invention is also suitable for a feed apparatus in which more than two sluice chambers are disposed in a vessel. However, the number of sluice chambers is preferably even, the sluice chambers being disposed in pairs at equal distances from the axis of the vessel. When one sluice chamber is being filled, the other is being emptied at the same time, the opening of the sluice chamber alternately communicating with the inlet and the outlet.

In accordance with a preferred embodiment of the invention, the piston having substantially the same diameter as the inner diameter of the cylinder is, in the beginning of the loading stage, pushed in the cylinder to its furthest position so that the volume of the sluice chamber is at its minimum and practically zero. During the loading stage, the piston moves in the cylinder so as to enlarge the volume of the sluice chamber. The piston contributes to the filling of the sluice chamber with solid material by causing a suction effect from the inlet channel to the sluice chamber. Preferably, the sluice chambers are disposed vertically within the vessel so that gravity also contributes to the filling of the sluice chamber with solid material.

As soon as the sluice chamber has been filled with a suitable amount of solid material, the vessel moves around its axis, for example 180°. A smaller or larger movement is also possible, depending on the ratio of the cross surface of the sluice chamber to the cross surface of the vessel. The rotational movement is carried out over a time period sufficient to permit, during that movement, the pressure in the sluice chamber to be raised by pressure feeding means substantially to the level of or higher than the pressure of the pressure channel. During the rotational movement, the sluice chamber opening is closed, sliding tightly along the covering plate, in order to prevent gas or solid material from escaping from the sluice chamber.

The rotational movement of the vessel ends as soon as the sluice chamber opening reaches the outlet in the covering plate. During the unloading of the sluice chamber, the piston moves within the cylinder towards the outlet, the solid material simultaneously being conveyed from the sluice chamber to the pressure channel. Transfer of the solid material may be brought about by either the piston effect or by raising the pressure in the sluice chamber higher than that in the pressure channel, or by a combination of the two.

Thus, in accordance with an exemplary embodiment of the invention, feeding fuel into a pressurized space is effected in stages by a feed apparatus comprising an inlet, sluice chamber, and outlet, and the feeding is carried out in such a manner that in a loading stage, solid material is conveyed from an inlet channel via the inlet into the sluice chamber, in a first transfer stage, the sluice chamber is shifted respective to the inlet and the outlet, or the inlet and the outlet are shifted respective to the sluice chamber so as to close the inlet and to open the outlet, in an unloading stage, solid material is conveyed from the sluice chamber via the outlet into a pressurized channel, and in a second transfer stage, the sluice chamber is shifted respective to the inlet and the outlet, or the inlet and the outlet are shifted respective to the sluice chamber so as to open the inlet and to close the outlet. The invention is especially suitable for feeding bio-fuel, such as bark and peat, into a pressurized space. It may also be employed in feeding of moist fuel.

The invention also relates to an apparatus for feeding solid material in a pressurized combustion or gasification plant from an inlet channel into a pressurized channel, the feed apparatus in an exemplary embodiment comprising a vessel which is rotatable around its axis, a covering plate, fixedly positioned on an end wall of the vessel and having at least one inlet communicating with the inlet channel and/or at least one outlet communicating with the pressure channel, and a sluice chamber disposed in the vessel so as to provide a tight connection between the opening in the sluice chamber and the covering plate.

A great advantage of the method and apparatus according to the invention is that either peat or some other light bio-fuel may be fed into a pressurized, fluidized bed gasifier or combustion plant. Feeding is undisturbed even if the pressure difference is high, i.e. over 4 bar or even over 20 bar. The method according to the invention is suitable e.g. when feeding fuel to a pressurized combustion plant or a gasifier.

In the feeding method in accordance with the invention, the risk of arching of the fuel is eliminated or minimized because the volume of the sluice chamber is changed, thus bringing about movement of the fuel.

In the feeding method and apparatus, caking of the fuel does not occur, which is important as to further treatment of the fuel.

It is, of course, important that the covering plate secures the tightness of the sluice chamber during the feed. Solid material cannot escape from the feed system. Neither hot nor poisonous gases leak backwards from the pressurized space, for example, to the space filled with fuel.

In conventional pressurizing systems for solid fuels, such as Lock-hopper equipment and rotary feeders, it is typical that gas leaks from the pressure side to such an extent that it affects the process yield. The leak has to be compensated by feeding a corresponding amount of gas to the pressurized space by a gas compressor. If the gas to be replaced is, for example, nitrogen, as is usual in connection with gasifying processes, the cost incurred may be considerable. In connection with an apparatus according to the invention, such leak is very small because gas leaks occur practically through sealing means only.

Other objects and advantages of the invention will become apparent from the detailed description which follows.

DETAILED DESCRIPTION OF THE DRAWINGS

Figure 1:
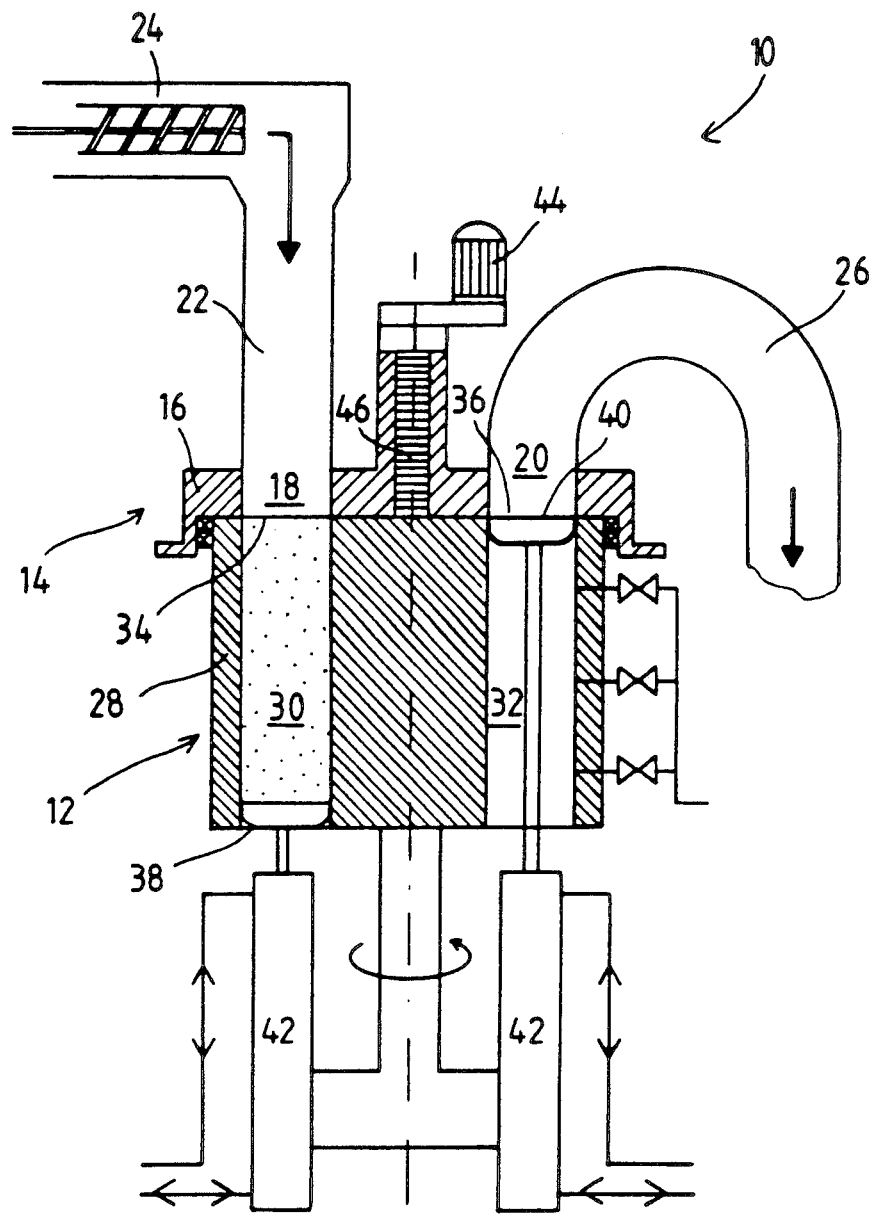
FIG. 1 is a schematic sectional view of a feed apparatus according to the invention during the loading and unloading stage.

A feed apparatus disclosed in FIG. 1 comprises a movable section 12 and a stationary section 14. The stationary section includes a covering plate 16 provided with an inlet 18 and an outlet 20. The inlet is connected to a feeding section, i.e. an inlet channel 22 for solid material. The feeding section is supplied with solid material by means of fuel feeders, for example, a screw 24. The outlet is connected with a pressure channel 26 at the discharge side of the feed apparatus, the pressure channel being in communication with a fuel silo, which is not shown.

The movable section comprises a cylindrical vessel 28 in which two cylindrical sluice chambers 30 and 32 are disposed. Other embodiments may, if desired, include more than two sluice chambers. The upper sections of the sluice chambers are provided with openings 34 and 36. The vessel 28 is provided with pistons 38 and 40 and drive cylinder 42 for moving the pistons within the sluice chambers. The covering plate 16 serves as an end plate for the vessel 28. In the feeding stage, as shown in FIG. 1, the opening 34 of the sluice chamber 30 is in communication with the inlet 18 in the covering plate. The opening 36 of the sluice chamber 32 is in communication with the outlet 20.

When the chamber 30 is filled with fuel, such as peat, the piston 38 lies in its lowest position as shown in FIG. 1. In the chamber 32, which has been emptied, the piston 40 lies in its topmost position.

As soon as the sluice chamber 30 has been filled with fuel, and the sluice chamber 32 has been emptied, the movable section is rotated around its axis so as to shift the opening 34 of the sluice chamber from the inlet 18 to the outlet 20. Correspondingly, the opening 36 of the sluice chamber is shifted to the inlet 18. The movement of the movable section is brought about by drive means 44. The drive means is connected to the upper section of the vessel through the covering plate by section 46 comprising bearing, clamping and lubrication means.

Figure 2:
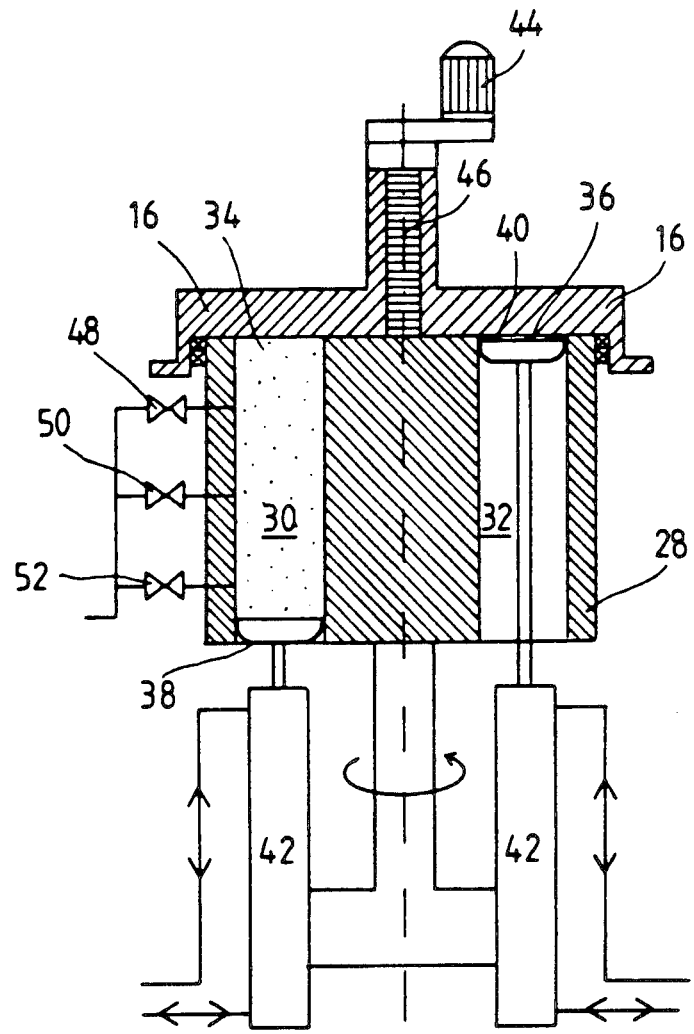
FIG. 2 is a schematic sectional view of the same feed apparatus during the transfer stage.

FIG. 2 illustrates a sluice chamber moving from the loading stage from the inlet to the outlet. In this intermediate or transfer stage, both sluice chamber openings 34 and 36 are closed. The covering plate is tightly positioned on the vessel so as to completely close the openings of the sluice chambers, which openings slide when the vessel moves along the surface of the covering plate.

In the exemplary embodiment illustrated, the loading and unloading of the sluice chambers may be arranged so as to take place in approximately 5 seconds and the shifting of the sluice chambers from one stage to another in approximately 2 seconds.

During the transfer stage, pressure is raised in the sluice chamber 30, for example, by compressed air or nitrogen by opening the valves 48, 50 and 52. Pressure valves, e.g. solenoid valves, may be arranged in the feed apparatus so as to raise the pressure in the sluice chamber 30 merely during the transfer stage when the opening of the sluice chamber is closed. Pressure valves may also be so disposed as not to effect the final pressurization over the pressure of the pressure channel until the sluice chamber is in communication with the pressure channel. However, the pressure prevailing in the sluice chamber has to be high enough at the outlet so as to prevent gases from flowing backwards from the pressure channel to the sluice chamber to such an extent that it would be harmful.

In the exemplary embodiment shown in FIGS. 1 and 2, the vessel rotates 180° during the loading and unloading stages. Thus, the cylindrical chambers 30 and 32 change places respective to the inlet and the outlet. When the vessel has rotated 180° and reached an end position, the pistons will move simultaneously in different directions. In one sluice chamber, the piston moves downwards and the chamber becomes filled with fuel. In the other chamber, the piston moves upwards and the chamber becomes unloaded. When the drive means 44 restarts the 180° movement, the solenoid valves 48-52 will open allowing some air or other gas to flow into the chamber which has been filled with fuel. The solenoid valves are not opened until the sluice chamber no longer is in connection with the fuel feeding means, i.e. the inlet channel 22. By means of the gas flowing through the solenoid valve, the cylinder is pressurized to the same pressure as prevails in the pressure channel 26. This prevents pressure strokes when the rotating movement causes the sluice chamber 30, loaded with fuel, to come into contact with the pressure duct 26.

If the number of sluice chambers is greater than 2, the rotary movement of the vessel correspondingly changes so that each loaded sluice chamber is shifted to come into contact with the outlet and each unloaded chamber is correspondingly shifted to come into contact with the inlet. During the transfer stage, the pressure of the fuel-loaded sluice chambers has to be raised to a suitable level.

FIGS. 1 and 2 illustrate a preferred embodiment, in which the feed apparatus is vertical. The position of the feed apparatus may also be inclined, whereby the gravity causes the fuel to flow onto the bottom of the cylindrical chambers. In some cases, the chambers may be even horizontal, in which case e.g. forced feed has to be used for loading thereof.

Vessel 28 is preferably in the shape of a large cylinder, but it may also be in some other shape. It is essential in any event that the sluice chambers disposed in the vessel are capable of moving relative to the inlets and outlets. In another variation, the vessel may be stationary and the inlets and outlets, or means serving as inlets and outlets, are movable. Again, it is essential that the filled sluice chamber can be oriented in communication with the outlet, and the empty sluice chamber can be oriented in communication with the inlet.

In the embodiment shown in FIGS. 1 and 2, the sluice chambers are also cylindrical, but they may, of course, be in some other shape as well. It is essential that a piston or some other means for adjusting the volume of the sluice chambers can be used in loading or unloading thereof. In accordance with the invention, the volume of the sluice chamber 30 is kept small as the loading stage starts and is gradually increased during the filling thereof. This prevents excess air from entering the sluice chamber. Such excess air could flow from the sluice chamber to the subsequent process stations, and uncontrollable excess air is very undesirable in such further processing.

The invention is not intended to be limited to the embodiments described above, but it can be modified and applied within the inventive scope as defined in the accompanying claims.

What is claimed is:

1. A method of feeding solid material into a pressurized space in stages and by means of a feed apparatus comprising an inlet, at least one sluice chamber defining a volume, and an outlet comprising the steps of:
   a) in a loading stage, conveying solid material from an inlet channel via the inlet into the sluice chamber;
   b) in a first transfer stage, shifting the sluice chamber relative to the inlet and the outlet, so as to disconnect the sluice chamber from the inlet and move the sluice chamber toward the outlet while maintaining said at least one sluice chamber closed;
   c) in an unloading stage, conveying solid material from the sluice chamber via the outlet into a pressure channel; and
   d) in a second transfer stage, shifting the sluice chamber relative to the inlet and the outlet, so as to disconnect the sluice chamber from the outlet and to move the sluice chamber toward the inlet while maintaining said at least one sluice chamber closed, wherein the chamber volume of the sluice chamber is enlarged during the loading stage and reduced during the unloading stage.

2. A method as claimed in claim 1, wherein the chamber volume of the sluice chamber is enlarged and reduced by moving a piston within the sluice chamber.

3. A method as claimed in claim 1, wherein said feed apparatus includes a pair of sluice chambers, with said at least one sluice chamber of said pair being emptied simultaneously with the filling of another of said pair of sluice chambers in step (c).

4. A method as claimed in claim 2, wherein fuel is drawn into said sluice chamber from the inlet channel by moving the piston towards the bottom of the sluice chamber.

5. A method as claimed in claim 2, fuel is discharged from said sluice chamber through an outlet by pushing the piston towards the outlet at the end of said sluice chamber.

6. A method as claimed in claim 1, wherein pressure is raised in the sluice chamber during the first transfer stage by means of a pressurized gas.

7. A method as claimed in claim 6, wherein the sluice chamber is pressurized substantially to the same pressure as prevails in the pressure channel.

8. A method as claimed in claim 1, fuel is both fed into and discharged from the sluice chamber through an upper section thereof.

9. A method as claimed in claim 1, wherein the vessel in which the sluice chamber is disposed, is rotated 180° around its axis during the transfer stage.

10. A feed apparatus in a pressurized combustion or gasification plant for introducing solid material from an inlet channel into a pressurized channel, said feed apparatus comprising:
a vessel which is rotatable about its axis,
a covering plate, fixedly positioned on an end wall of the vessel and having at least one inlet communicating with an inlet channel, and one outlet communicating with the pressure channel, and
a sluice chamber, disposed in the vessel so as to provide a tight connection between an opening of the sluice chamber and the covering plate, wherein
the sluice chamber is cylindrical and provided with a piston, the diameter of which is substantially the same as the inner diameter of the sluice chamber, and which is capable of adjusting the chamber volume of the sluice chamber; and
means for rotating said vessel and said sluice chamber between said inlet and said outlet while maintaining said sluice chamber in tight connection with said covering plate so that said sluice chamber remains closed during movement between said inlet and said outlet.

11. A feed apparatus as claimed in claim 10, wherein two sluice chambers are disposed in the vessel, said sluice chambers being alternately loaded and unloaded.

12. A feed apparatus as claimed in claim 10, wherein, in a loading stage, said opening in the sluice chamber is in tight connection with the inlet of the covering plate.

13. A feed apparatus as claimed in claim 10, wherein, in an unloading stage, said opening of the sluice chamber is in tight connection with the outlet of the covering plate.

14. A feed apparatus as claimed in claim 11, wherein the covering plate is provided with both the inlet and the outlet, and the sluice chambers are so disposed in the vessel that, when one sluice chamber is in contact with the inlet, the other sluice chamber is in contact with the outlet.

15. A feed apparatus as claimed in claim 10, the vessel is arranged with feeding means for pressurized gas, said feeding means being capable of raising pressure in the sluice chamber.

16. A feed apparatus as claimed in claim 10, and further comprising means for moving the piston of the cylinder in said cylinder.

17. A feed apparatus as claimed in claim 10, wherein the covering plate is disposed above the vessel and the sluice chamber is disposed vertically in the vessel, said sluice chamber having an opening at the upper end thereof, which opening is, during a loading stage, in communication with the inlet in the covering plate and, during an unloading stage, in communication with the outlet in the covering plate, and the lower end of the sluice chamber being operatively connected with means for moving a piston vertically in the sluice chamber.

18. A feed apparatus as claimed in claim 10, wherein the vessel is in the shape of a cylinder, and at least two cylindrical sluice chambers are disposed in the vessel.

19. A feed apparatus in a pressurized combustion or gasification plant for introducing solid material from an inlet channel into a pressurized channel, said feed apparatus comprising:
a vessel which is rotatable about its axis,
a covering plate, fixedly positioned on an end wall of the vessel and having at least one inlet communicating with an inlet channel, and one outlet communicating with the pressure channel, and
a sluice chamber, disposed in the vessel so as to provide a tight connection between the opening of the sluice chamber and the covering plate, wherein
the sluice chamber is cylindrical and provided with a piston, the diameter of which is substantially the same as the inner diameter of the sluice chamber, and which is capable of adjusting the chamber volume of the sluice chamber, and further wherein the vessel is arranged with feeding means for pressurized gas, said feeding means being capable of raising pressure in the sluice chamber.

* * * * *